Oct. 22, 1968             L. D. MASSER             3,406,983
SUSPENSION FOR AUTOMOTIVE VEHICLES
Filed Nov. 25, 1966             2 Sheets-Sheet 1
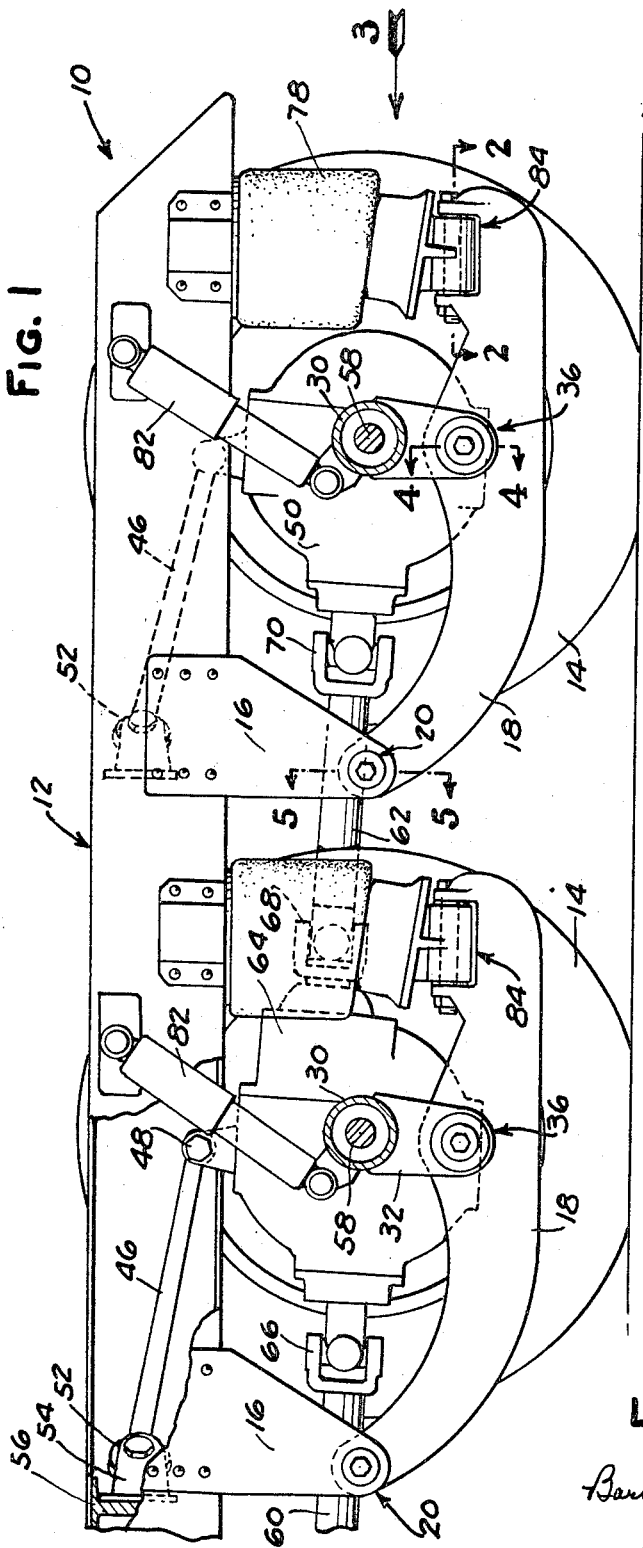
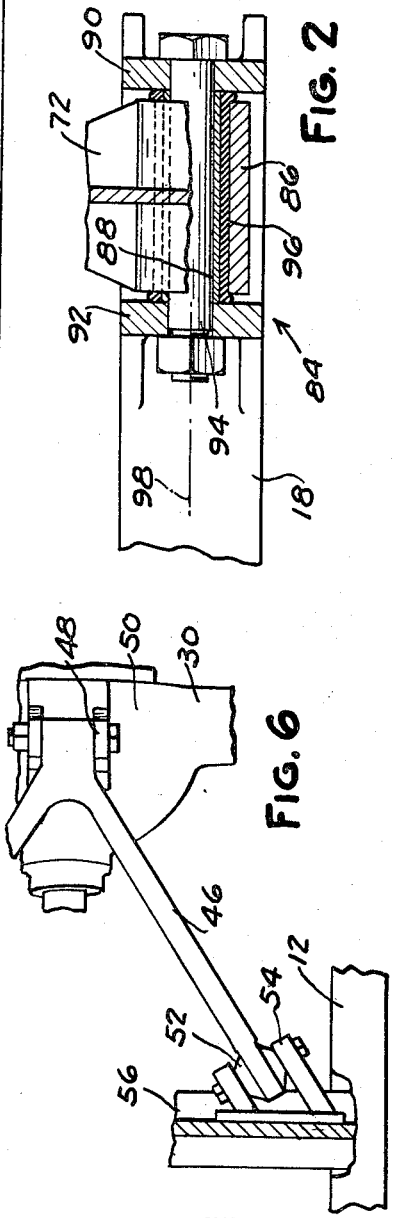
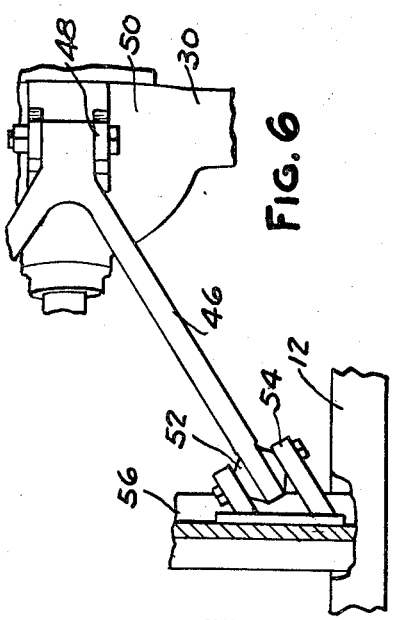
INVENTOR.
LLOYD D. MASSER
BY
Barnes, Kisselle, Raisch & Choate
ATTORNEYS Oct. 22, 1968     L. D. MASSER     3,406,983

SUSPENSION FOR AUTOMOTIVE VEHICLES

Filed Nov. 25, 1966     2 Sheets-Sheet 2

INVENTOR.
LLOYD D. MASSER
BY
Barnes, Kisselle, Raisch & Choate
ATTORNEYS

United States Patent Office 3,406,983
Patented Oct. 22, 1968

3,406,983
SUSPENSION FOR AUTOMOTIVE VEHICLES
Lloyd D. Masser, Muskegon, Mich., assignor to Neway Equipment Company, Muskegon, Mich., a corporation of Michigan
Filed Nov. 25, 1966, Ser. No. 596,881
13 Claims. (Cl. 280—124)

ABSTRACT OF THE DISCLOSURE

Disclosed herein is an air spring suspension wherein a pair of wheels 14 is mounted on an axle housing 30 mounted for generally linear vertical movement relative to vehicle frame 12 by a parallelogram arrangement with control arms 18 and a torque rod 46. Control arms 18 swing vertically about pivots 20. Axle brackets 32 are relatively flexibly connected to control arms 18 at rubber bushed pivot joints 36 to facilitate relative swinging of the axle brackets and control arms upon vertical movements of the axle.

A lateral beam 72 is connected with control arms 18 by rubber bushed articulating joints 84. The beam torsionally resists differential vertical swinging movement of the control arms and braces them against horizontal movements relative to the frame. The rubber bushings yield to permit controlled amounts of such movements. Beam 72 is so mounted as to transmit the load of air springs 78 from their center lines 100 to the longitudinal center lines 98 of control arms 18.

Disclosure

The suspension of this invention is especially adapted for use with air springs in commercial vehicles and can be employed in single axle units or in tandem arrangements of two or more axles. The axles can be either driven or non-driven.

An air spring is essentially an air inflated bag and of itself has insignificant lateral stability. Therefore in air spring suspensions it is necessary to provide mechanical means for controlling all lateral forces and force components on the suspension and its various members. In some previous suspensions this has been accomplished by the use of relatively complicated systems of torque rods, lateral stabilizer bars, bolsters and the like, especially in tandem arrangements.

A greatly simplified suspension is shown in Masser 3,140,880 in which the air springs are disposed between two vertically swinging control arms to which the axle is also attached. One feature of that suspension is that much of the lateral force is controlled by a strong, relatively rigid attachment between the axle and control arms. While the suspension shown in the Masser patent is highly satisfactory in certain types of installations, it is sometimes desirable in a suspension to provide for greater flexibility of movement between the axle and control arms.

One example is where a torque rod is used in conjunction with the control arms to provide a parallelogram vertical movement of the axle and such an arrangement is selected for illustration of the inventioin. With this arrangement the control arms rock about a horizontal pivot while the axle moves more nearly linearly up and down. Thus the axle attachment must permit considerable relative rocking between the control arm and axle housing. Providing such a flexible axle attachment diminishes to a considerable degree the ability of the axle and control arms to control lateral forces in the suspension.

The object of the present invention is to provide a relatively simple, inexpensive suspension structure improved to control adequately all forces in an air spring suspension other than the vertical forces controlled by the springs themselves, while at the same time facilitating the use of a relatively flexible connection between the control arms and axle.

In general the invention contemplates the use of a beam which is connected to the control arms and through which the spring load is transmitted between the control arms and the vehicle frame. This beam provides a torsion member which resists differential vertical swinging movements of the control arms. The beam also braces the control arms against horizontal movements thereof relative to the vehicle frame. One or more joints are provided in the beam or its connections to the control arms and these joints articulate to a limited degree upon any such movements of the control arms. The joints incorporate bodies of material which distort resiliently when the joints articulate. This material is dimensioned, configured and distributed so as to provide a generally predetermined resistance to each of the movements of the control arms.

In the drawings:

FIG. 1 is a view partly in side elevation and partly in vertical section illustrating a suspension which incorporates the present invention, certain of the components being shown in phantom and certain being shown diagrammatically.

FIG. 2 is a enlarged sectional view on line 2—2 of FIG. 1.

FIG. 6 is a fragmentary, partly diagrammatic top plan view illustrating a torque member.

Figure 5:
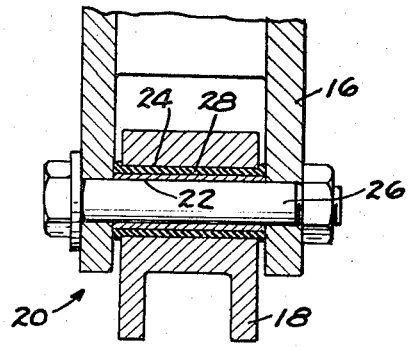
FIG. 5 is an enlarged sectional view on line 5—5 of FIG. 1.

Shown in the drawings is a vehicle 10 having a frame 12 from which ground engaging wheels 14 are suspended by suspensions embodying the present invention. The frame has depending brackets 16 adjacent each side of the vehicle and control arms 18 are pivotally secured to these brackets at 20 so that the control arms can swing vertically relaitve to frame 12. As shown in FIG. 5, each pivot 20 comprises an inner member 22 on bracket 16 surrounded by an opening 24 in control arm 18. The pivot members are secured together by a bolt 26 and the pivot is rubber bushed at 28.

Figure 4:
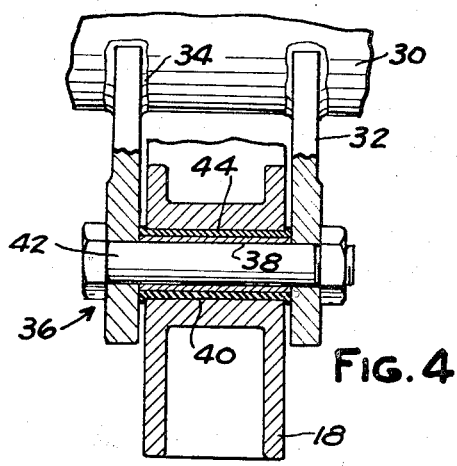
FIG. 4 is an enlarged sectional view on line 4—4 of FIG. 1.

Each wheel 14 is mounted on an axle housing 30 having a bracket 32 rigidly anchored thereto as by welding 34 (FIG. 4). Each bracket 32 has a pivotal connection 36 with a control arm 18. As shown in FIG. 4, each connection 36 comprises an inner member 38 on bracket 32 surrounded by an opening 40 in control arm 18. The pivot members are secured together by a bolt 42 and the pivot is rubber bushed at 44.

A combined torque rod and track bar 46 having wishbone shape is centrally pivoted at 48 to a portion of the axle such as differential housing 50. The ends of the wishbone (only one being shown) are pivotally connected at 52 to a bracket 54 on a transverse frame member 56. Central pivot 48 is preferably metal to metal and thus relatively rigid while end pivots 52 are preferably rubber bushed. Control arms 18 and torque rod 46 cooperate with axle 30 to form a parallelogram which constrains axle 30 to a generally linear vertical movement relative to frame 12 as the vehicle traverses uneven surfaces. Wishbone 46 also supports the axle against axial shifting relative to frame 12.

Both axles illustrated are driven. However, both could be non-driven or one could be driven and the other non-driven. In the illustrated structure axle shafts 58 are driven, one by a propellor shaft 60 and the other by a propellor shaft 62 through conventional differential gearing (not shown) contained in differential housings 50. Shaft 62 is driven by a conventional power take-off from a transfer case 64 on the forward axle. Forward shaft 60 has a universal joint 66 and rearward shaft 62 has universal joints 68 and 70. While in the illustrated structure both sets of control arms 18 trail their respective pivots 20, one or both could extend forwardly of their pivots.

In accordance with the invention a beam 72 is connected to and extends between each pair of control arms 18. Beam 72 has adjacent each end a platform 74 which supports the lower end portion 76 of an air spring 78. The upper portion 80 of the air spring is mounted in supporting relation to frame 12. Rebound of springs 78 is controlled by shock absorbers 82 connected to frame 12 and axles 30 as shown.

Beam 72 is connected to control arms 18 by means of pivotal connections 84. As shown in FIG. 2, pivot 84 comprises a sleeve 86 at the end of beam 72 forming one pivot member and surrounding a tube 88 which extends between lugs 90, 92 on control arm 18 and which forms the inner pivot member. A bolt 94 passes through the sleeve and tube and secures them together. A bushing 96 of a resiliently distortable material such as an elastomer is tightly confined between sleeve 86 and tube 88. The axis of the pivot thus formed coincides substantially with the longitudinal center line 98 of control arm 18. Pivot 84 facilitates relative swinging of beam 72 and control arm 18 about the pivot axis; elastomer bushing 96 provides some torsional resistance to such swinging.

Figure 3:
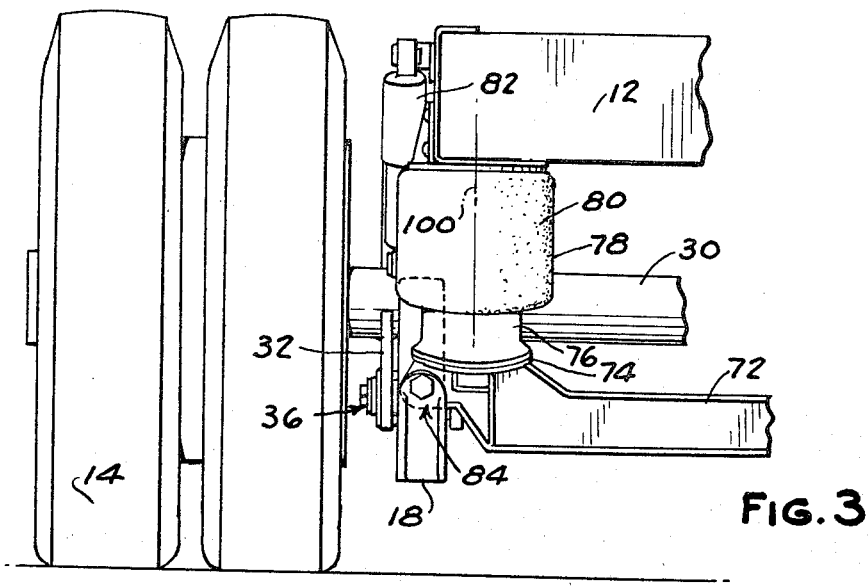
FIG. 3 is a fragmentary end view looking in the direction of arrow 3 of FIG. 1.

Air springs 78 are positioned as far as practicable from the longitudinal center line of the vehicle in order to obtain maximum lateral stability. The air springs have a substantial diameter so that they can utilize relatively low pressures. In order to avoid interference with the wheels, the center lines 100 of the air springs typically must be disposed laterally inwardly of the longitudinal center lines 98 of the control arms (FIG. 3). Beams 72 cause load on the load centers 100 of the springs to be transferred outwardly through pivots 84 to the longitudinal center lines of the control arms. By this means maximum advantage is taken of the strength of axle housings 30. It will be noted that portions of springs 78 and their supporting platforms 74 are disposed vertically over pivots 84.

In use, assuming that vehicle 10 is moving straight ahead and that wheels 14 at opposite sides of the vehicle roll over similar irregularities, there is no significant differential movement between any pair of control arms, and forces in the suspension are controlled primarily by air springs 78 and attachments 20 and 36 between the control arms and bracket 16 and axle 30, respectively. Joints 20 and 36 are relatively flexible. This permits the control arms to swing about pivots 20 while at the same time permitting axle brackets 32 to swing about pivots 36, as a result of the fact that axle housing 30 is constrained in generally linear vertical movement rather than swinging movement about pivot 20. As was pointed out above, this axle movement results from the parallelogram geometry of torque rod 46, the axle housing and the control arms.

Let it now be assumed that the vehicle is encountering some road conditions which causes differential vertical swinging movement of the two control arms 18 attached to a common axle 30. This condition occurs when the vehicle rounds a curve so that it tends to lean to one side. It also occurs when one wheel 14 traverses a bump or depression while the other wheel passes over an unlike surface. Were it not for the presence of beam 72 and its connections with the control arms, the relatively flexible pivotal joints 20 and 36 would provide insufficient lateral stability for the vehicle.

However with the present structure, pivotal connections 84 which are elongated along the longitudinal center lines of control arms 18, strongly resist the tendency of the control arms to rock relative to beam 17 about an axis generally longitudinal of beam 72. Thus differential vertical swinging movement of the control arms stresses beam 72 in torsion, which thereby resists such differential vertical swinging. Elastomer sleeves 96 in joints 84 also yield slightly to but resist torsional moments on beam 72.

Unlike vertical swinging of the control arms also tends to increase the distance between the axes of pivotal connections 84. Elastomer bushings 96 also yield somewhat in a radial direction to accommodate this tendency.

When the vehicle rounds a corner, forces are exerted on the suspension which tend to swing the control arms in a horizontal direction laterally of the vehicle frame. This tends to distort beam 72 and control arms 18 out of their normal rectangular relation. However elongate pivotal connections 84 strongly resist this tendency. Beam 72 thus provides a brace which supports the control arms against this horizontal lateral movement relative to the frame. Elastomer bushings 96, however, yield slightly to permit a limited amount of such movement. Beam 72 may be stressed either in tension or compression at this time depending upon the specific conditions encountered.

Under many conditions of highway travel, the forces discussed above will all be acting on the suspension at the same time to a greater or lesser extent. Beam 72 and its connections 84 to the control arms provide adequate stability for the suspension under any combination of such forces which the vehicle is designed to encounter. The characteristics of beam 72 and its pivotal connections 84 with the control arms can be varied to provide each individual suspension with operating characteristics which will be required of vehicle 10.

For example, pivot 84 can be lengthened or shortened to provide respectively greater or lesser rigidity. Elastomer material 96 can be thickened for greater flexibility or reduced in thickness for greater rigidity, and the elastomer can be given different shapes to provide greater or lesser resistance to specific forces expected in the suspension. Beam 72 can be configured and dimensioned likewise to provide greater or lesser resistance to forces thereon incidental to operation of the vehicle.

In short, even though a suspension according to the invention is made rigid enough to support vehicle 10 under all operating conditions expected, nevertheless the provision of articulating joints 84, articulation of which is resisted by elastomer material 96, provides the suspension with the flexibility necessary to prevent undue strain on the metal parts which would otherwise result in rapid wear, fatigue and failure.

In a typical highway vehicle having a suspension according to this invention, beam 72, articulating joints 84 and the elastomer material 96 are so arranged that differential vertical swinging movement of control arms 18 is limited to a maximum of about 3" when the vehicle is empty and 6" when the vehicle is loaded. Maximum horizontal movements of the control arms relative to the frame is a fraction of an inch. If the vehicle is to traverse uneven ground off of the highway, the various components would be constructed and arranged to permit greater maximum movements of the control arms, particularly differential vertical movements.

Figure 7:
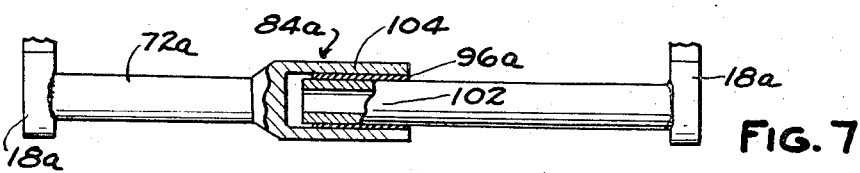
FIG. 7 is a diagrammatic illustration of a modified form of the invention.

The form of the invention shown diagrammatically in FIG. 7 is in general similar to that described above except that beam 72a is rigidly connected to control arms 18a as by welding. Beam 72a is provided with an articulating joint 84a comprised of beam portions 102, 104 disposed in telescoped relation with a body of elastomer material 96a disposed therebetween. With this arrangement joint 84a can articulate as necessary when beam 72a is in torsion, is under compression or tension, or is under forces tending to deflect it. Thus the beam and its articulated joint yieldably supports control arms 18a against the various forces thereon discussed above.

Figure 8:
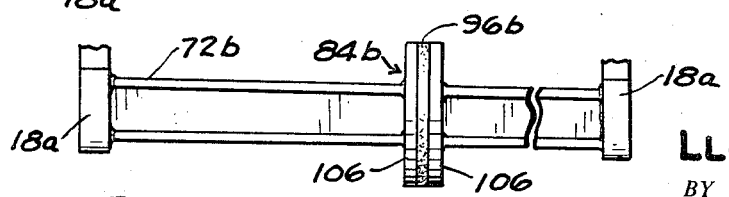
FIG. 8 is a diagrammatic illustration of a modified form of the invention.

FIG. 8 illustrates a modified form of the invention similar to that shown in FIG. 7 except that beam 72b has spaced apart flanged portions 106 secured to an interposed body of elastomer material 96b thereby providing an articulating joint 84b. With this arrangement also the beam and its joint can yieldably support the control arms against the various forces thereon discussed above.

As in the form of the invention first described above, the resistance offered by beams 72a and 72b to unlike movements of the control arms to which they are connected can be varied by changing the characteristics of the beam itself and of the components forming articulating joints 84a and 84b.

What is claimed is:

1. In a vehicle having a frame with ground engaging wheels suspended therefrom through axle means connected with a pair of longitudinally extending, vertically swingable control arms adjacent the sides of the vehicle mounted in generally parallelogram arrangement with torque rod means, and spring means operably interposed between said control arms and frame, improved structure which comprises,
    beam means extending transversely of said control arms and being connected therewith,
    said beam means being disposed in load transmitting relation between said spring means and said control arms,
    said beam means providing torsion means operative to resist differential vertical swinging movements of said control arms and also providing brace means operative to resist horizontal movements of said control arms relative to the vehicle frame,
    joint means which incorporates means on said beam means and which articulates responsive to said movements of said control arms,
    said joint means including a material resiliently distortable responsive to articulation thereof,
    said material being configured and dimensioned to provide a generally predetermined resistance to each of said movements of said control arms.

2. The structure defined in claim 1 wherein said joint means comprises the connection between said beam means and a control arm.

3. The structure defined in claim 2 wherein said joint means is effective to facilitate relative swinging movement of said beam means and control arm about an axis extending generally longitudinal of the control arm.

4. The structure defined in claim 3 wherein said joint means comprises a pivot having members relatively rotatable about said axis, said members being elongate longitudinally of said control arm and thereby providing support against relative rocking of said beam means and control arm about an axis transverse to the pivot axis.

5. The structure defined in claim 4 wherein one of said members comprises a fixed pivot element on said control arm and the other member comprises a sleeve on said beam means surrounding said element, said material being operably interposed between said element and sleeve.

6. The structure defined in claim 1 wherein said spring means comprises a pair of air springs having load centers which are spaced inwardly of the longitudinal center lines of said control arms, said beam means being so mounted as to transmit spring load thereon to said control arms substantially at said longitudinal center lines.

7. The structure defined in claim 6 wherein said beam means has immediately adjacent each of its connections with said control arms a platform forming a support for one of said air springs, a portion of said platform vertically overlying said longitudinal center line of the adjacent control arm.

8. The structure defined in claim 1 wherein said beam means comprises a single continuous beam having opposite end portions each of which is formed as one member of a pivot,
    each control arm having thereon means forming the other member of a pivot,
    said members cooperating to provide pivotal connections between the control arms and said beam,
    the axis of each pivot extending generally in the direction longitudinal of the respective control arm to facilitate relative swinging of said beam and control arms about said axes,
    said pivot members being elongate longitudinally in said direction and thereby cooperating to provide support against relative rocking of said beam and control arms about an axis transverse to said pivot axes,
    said resilient material being operably interposed between said pivot members,
    said spring means comprising a pair of air springs having load centers which are spaced inwardly of the longitudinal center lines of said control arms,
    said pivot axes being so disposed as to transmit spring load on said beam to said control arms substantially at said longitudinal center lines.

9. The structure defined in claim 1 wherein said beam means comprises a single continuous beam extending between said control arms, said beam having end portions connected with said control arms, said joint means comprising the connections between said beam ends and control arms.

10. The structure defined in claim 1 wherein said beam means comprises two beam members each of which has an outer end portion connected with one of said control arms, said members having inner end portions provided with said means on said beam means which said joint means incorporates.

11. The structure defined in claim 10 wherein said inner end portions are interconnected by said joint means.

12. The structure defined in claim 11 wherein said inner end portions are telescoped one within the other to provide said joint means, said resiliently distortable material being disposed between said telescoped portions.

13. The structure defined in claim 11 wherein by means of said joint means said inner end portions are secured in axially spaced relation and said resiliently distortable material is operably disposed therebetween.

References Cited

UNITED STATES PATENTS 3,154,321 10/1964 McLean _____ 280—124
2,827,282 3/1958 Weiss _____ 267—15

PHILIP GOODMAN, *Primary Examiner.*